(12) United States Patent
Mott

(10) Patent No.: US 11,848,695 B2
(45) Date of Patent: *Dec. 19, 2023

(54) SYSTEMS AND METHODS FOR MITIGATING MULTIPATH RADIO FREQUENCY INTERFERENCE

(71) Applicant: Purdue Research Foundation, West Lafayette, IN (US)

(72) Inventor: John H. Mott, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/820,988

(22) Filed: Aug. 19, 2022

(65) Prior Publication Data

US 2022/0399911 A1  Dec. 15, 2022

Related U.S. Application Data

(63) Continuation of application No. 16/903,099, filed on Jun. 16, 2020, now Pat. No. 11,444,644.

(60) Provisional application No. 62/862,263, filed on Jun. 17, 2019.

(51) Int. Cl.
| | |
|---|---|
| *H01Q 11/08* | (2006.01) |
| *H01Q 3/30* | (2006.01) |
| *H01Q 1/36* | (2006.01) |
| *H04B 1/10* | (2006.01) |
| *H04B 1/7085* | (2011.01) |

(52) U.S. Cl.
CPC ............ *H04B 1/1081* (2013.01); *H01Q 1/362* (2013.01); *H01Q 11/08* (2013.01); *H04B 1/7085* (2013.01)

(58) Field of Classification Search
CPC . H01Q 1/36; H01Q 3/26; H01Q 11/08; H01Q 3/30; H01Q 3/34; H01Q 3/36; H04B 1/10; H04B 1/1081; H04B 1/7085
See application file for complete search history.

(56) References Cited

U.S. PATENT DOCUMENTS

| | | | |
|---|---|---|---|
| 6,552,695 B1* | 4/2003 | Strickland | H01Q 3/02 343/895 |
| 10,910,725 B2* | 2/2021 | Goh | H01Q 11/08 |
| 2013/0328743 A1* | 12/2013 | Coburn | H01Q 1/40 343/873 |
| 2018/0233798 A1* | 8/2018 | Moriguchi | H01Q 11/083 |

FOREIGN PATENT DOCUMENTS

| | | | | |
|---|---|---|---|---|
| WO | WO-2017026107 A1 * | 2/2017 | | H01P 5/222 |
| WO | WO-2017200371 A1 * | 11/2017 | | H01Q 1/242 |

* cited by examiner

*Primary Examiner* — Blane J Jackson

(57) ABSTRACT

A radio frequency transmission system and methods for mitigating multipath radio frequency interference are disclosed. Embodiments include a first helical antenna having a first radius and operable to receive a first electromagnetic signal, and a second helical antenna having a second radius and operable to receive a second electromagnetic signal. Further embodiments include a phase adjuster configured to receive the first electromagnetic signal as an input signal, apply an adjustable phase delay to the input signal, and output an adjusted electromagnetic signal. Still further embodiments include a signal combiner configured to receive the adjusted electromagnetic signal and the second electromagnetic signal and output a combined electromagnetic signal.

20 Claims, 3 Drawing Sheets

SYSTEMS AND METHODS FOR MITIGATING MULTIPATH RADIO FREQUENCY INTERFERENCE

This application is a continuation of U.S. patent application Ser. No. 16/903,099, filed Jun. 16, 2020, now allowed, which claims the benefit of U.S. Provisional Patent Application No. 62/862,263, filed Jun. 17, 2019, the entireties of which are hereby incorporated herein by reference. Any disclaimer that may have occurred during the prosecution of the above-referenced application(s) is hereby expressly rescinded.

FIELD

Embodiments of this disclosure relate generally to radio frequency transmission and reception systems, and in particular, to antennas that mitigate multipath interference in transmission systems mounted relatively close to reflecting surfaces.

BACKGROUND

Direct connectivity to data networks can be intermittent in rural areas. For example, at rural airports, the inadequate or sometimes nonexistent direct network connectivity can inhibit the compilation and analysis of aviation operations data that drives identification and mitigation of aviation-related safety risk factors. While commercial sensors are available to measure a variety of aviation-related factors ranging from weather conditions to aircraft movements, data studies are hindered by the need for network infrastructure to transmit and store such information.

The inventor of the current disclosure realized that data transmission systems designed within the power and cost domains of rural airfield owners, such as radio frequency transmission systems that reduce the signal interference experienced in long-range, low-to-ground data transmission, are needed. Improved radio frequency transmission systems can directly and immediately improve safety and operational efficiency at aviation airports nationwide, as well as improve general network connectivity within rural areas for other common uses. Certain preferred features of the present disclosure address these and other needs and provide other important advantages.

SUMMARY

The inventor of the present disclosure realized that opportunity for a data transmission system can be visualized by viewing the moderate-speed broadband coverage territories provided by Internet service providers in relation to the concentrated distribution of general aviation airports across the United States. Overlaying of the general aviation airport locations onto the broadband coverage territory maps illustrates that a multitude of airports fall in rural regions lacking Internet connectivity. This lack of Internet connectivity can be detrimental to transportation infrastructure and rural life alike, as seen by rapid population emigration from rural areas over the last century. Such a data transmission system would have a significant impact on the country's aviation transportation network, as a large proportion of rural airports lack the network access required for transmitting sensor data to a centralized location.

As information analytics and cloud computing emerge as a technological trend of the future, data-driven decision-making is increasingly attainable for enhancing aviation safety measures. The aviation industry can generate large volumes of operations data, the harvesting and application potential of which has not been fully realized. Comprised of characteristics of each aircraft, information on each flight, and ambient conditions at each instance in time, airport operations data can be compiled in ever-increasing layers of specificity. Aircraft characteristics such as airframe age, powerplant type, base location, manufacturer, class, and number of seats are mostly static, and can be reported and stored according to tail number and registration. Flight information includes landing and takeoff times, flight times, ground times, flight frequencies, schedules, number of passengers and crew, and approach and departure routings, among others. Atmospheric conditions encompass meteorological readings such as temperature, pressure, humidity, precipitation, and wind velocity.

As recent commercial advancements and technological trends empower airport managers with data collection solutions, the transient obstacle to aviation data analytics shifts to information transmission. Known as the "Last Mile" problem in Internet service provision, the lack of demand for Internet connectivity in rural areas inhibits construction of network infrastructure as Internet providers fail to achieve economies of scale with such low population densities. Due to the high financial, infrastructural, and technological barriers to entry of Internet service providers, rural airport managers lack the capability to store and analyze collected data, effectively rendering sensor systems useless and potentially exposing aviation operations to lurking risks.

A large issue in data transmission over the so-called "Last Mile" is not necessarily the range between an antenna and a network access point, but rather the multipath interference inhibiting the signal transmission. Traditionally, antennas have been mounted on high poles to circumvent this multipath interference, but this solution fails to address the underlying technical problem and proves impractical in a wide variety of geographies and situations. Uneven topography, extreme weather, and tree concentration may prohibit the use of tall, pole-mounted antennas in rural areas. Similarly, safety-induced height restrictions near airports prevent elevated antenna arrays from being constructed on airfield grounds.

In accordance with a first aspect of embodiments of the present disclosure, the methods and systems disclosed herein can recover power lost in a radio frequency transmission system due to signal interference (for example, destructive interference at the receiving antenna) resulting from planar reflections of a portion of the transmitted waves incident upon those reflecting surfaces.

In accordance with another aspect of embodiments of the current disclosure, a first helical antenna can have a first radius and can be operable to receive a first electromagnetic signal. A second helical antenna can have a second radius and can be operable to receive a second electromagnetic signal. Further, a phase adjuster, or phase trimmer, can be configured to receive the first electromagnetic signal as an input signal, apply an adjustable phase delay to the input signal, and output an adjusted electromagnetic signal. Still further, a signal combiner can be configured to receive the adjusted electromagnetic signal and the second electromagnetic signal and output a combined electromagnetic signal.

This summary is provided to introduce a selection of the concepts that are described in further detail in the detailed description and drawings contained herein. This summary is not intended to identify any primary or essential features of the claimed subject matter. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example, and not to be construed as limiting.

DETAILED DESCRIPTION OF THE ILLUSTRATED EMBODIMENTS

Figure 1:
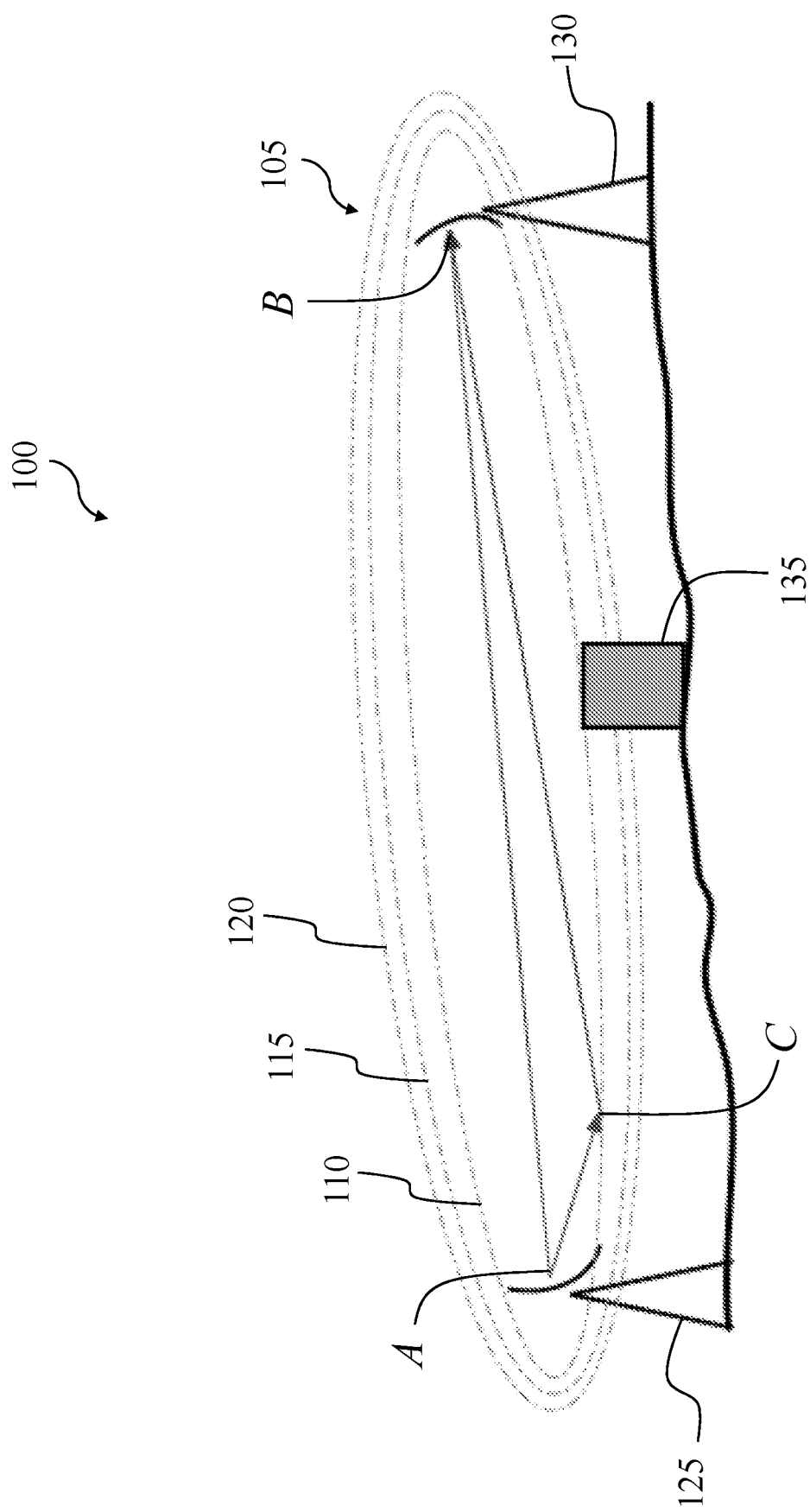
FIG. 1 depicts a block diagram of an illustrative radio frequency transmission wave propagating within a Fresnel zone.

For the purposes of promoting an understanding of the principles of the disclosure, reference will now be made to one or more embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates, At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to benefits or advantages provided by some embodiments, other embodiments may not include those same benefits or advantages or may include different benefits or advantages. Any benefits or advantages described herein are not to be construed as limiting to any of the claims.

Likewise, there may be discussion with regards to "objects" associated with some embodiments of the present invention, it is understood that yet other embodiments may not be associated with those same objects, or may include yet different objects. Any advantages, objects, or similar words used herein are not to be construed as limiting to any of the claims. The usage of words indicating preference, such as "preferably," refers to features and aspects that are present in at least one embodiment, but which are optional for some embodiments.

Specific quantities (spatial dimensions, temperatures, pressures, times, force, resistance, current, voltage, concentrations, wavelengths, frequencies, energy, heat transfer coefficients, dimensionless parameters, etc.) may be used explicitly or implicitly herein, such specific quantifies are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

The systems and method described herein can provide the crucial "Last Mile" link in data transmission infrastructures. Radio frequency antennas of the current disclosure can be configured to function, for example, as a Wi-Fi bridge system and may be utilized for mid-range network connectivity. Rather than constructing a larger and costlier antenna, the improved system directly mitigates multipath interference by using directional antennas and advanced processing to reduce the magnitude and effects of interference. Particularly, the radio frequency antennas of the current disclosure reduce signal interference arising from low elevation, long range data transmission, the antenna system includes helical components. Because the antenna system can transmit and interpret data over long ranges and low elevations, the antenna system is more power-efficient and cost-effective than prior art transmission systems which attempt to circumvent natural and man-made sources of transmission signal interference.

The polarization of the electromagnetic wave radiated by a monofiliar helical antenna is circular, and that the radiating pattern is primarily axial in nature. This radiation mode occurs in the helical antenna when the condition $C \cong 1\lambda$ is true, where C represents the circumference of the helix and $\lambda$ represents the wavelength of the transmitted wave. This axial transmission mode is denoted $T_1$ and may also be called "end-fire" mode.

One property of an electromagnetic wave is its polarization, which describes the orientation of the electric field (E. When a plane wave travels and its electric field vector rotates as the wave moves forward in the "z" direction, the components of E in the "x" and "y" directions, respectively, can be illustrated:

$$E_x = E_1 \sin(\omega t - \beta z), \text{ and}$$

$$E_y = E_2 \sin(\omega t - \beta z + \delta),$$

where $E_1$ and $E_2$ represent the amplitudes of the wave in the "x" and "y" directions, respectively, and $\delta$ represents the phase angle by which $E_y$ leads $E_x$. When $E_1 = E_2$ and $\delta = \pm 90$, the wave is considered to be circularly polarized.

FIG. 1 illustrates an example radio frequency transmission wave propagation (100) within a Fresnel zone (105). A Fresnel zone (105) is a series of concentric ellipsoidal regions of alternating double strength and half strength volumes of a wave's propagation, caused by a wave following multiple paths as it passes by an object and is partially refracted by it, resulting in constructive and destructive interference as the different length paths go in and out of phase. Fresnel zones (105) are often seen in optics, radio communications, electrodynamics, seismology, acoustics, gravitational radiation, and other situations involving the radiation of waves and multipath propagation.

Fresnel zones (105) include concentric ellipses (110, 115, 120), or zones, centered on the direct transmission path, from the transmitter (125) to the receiver (130) (e.g., the propagation path from point A to point B). The first zone (110) is the ellipse with chords one-half wavelength longer than the direct path (e.g., from point A to point C to point B). If a reflective object is very near the direct path AB, a linearly polarized wave will experience a 180-degree phase shift and cancel the direct wave at the receiver (130). If a reflective object is tangent to the first zone (110), the linearly-polarized wave will be shifted 180-degrees because of the increased path length, it will then undergo an additional 180-degree phase shift due to the reflection, and therefore it will reinforce the direct wave received by the receiver (130). Consequently, there should ideally be no reflective objects in the first zone (110) when utilizing linearly polarized waves.

Therefore, if unobstructed, linearly polarized waves will travel in a straight line from the transmitter (125) to the receiver (130) along path AB. But if there are reflective surfaces along the path, such as bodies of water or smooth terrain, the linearly polarized waves reflecting off those surfaces may arrive either out of phase or in phase with the signals that travel directly to the receiver. Waves that reflect off surfaces within an odd Fresnel zone, such as the first zone (110) and/or the third zone (120), are shifted out of phase with the direct-path wave and they will ultimately reduce the power of the signal received by the receiver (130). Waves that reflect off surfaces within an even Fresnel zone, such as the second zone (115), arrive at the receiver (130) in phase with the direct-path wave AB and can ultimately enhance the power of the received signal.

However, the direction of polarization (i.e., the direction of rotation of the vector E) of a circularly polarized wave is reversed when the plane wave strikes a perfectly conducting flat surface and is reflected in the same direction of travel. This characteristic of circularly polarized waves can be used as an advantage in Wi-Fi transmission when various reflecting surfaces are present along the transmission path. For comparison, the polarization characteristics of linearly polarized waves do not change when those waves are reflected from smooth flat surfaces, thereby resulting in the reflected portion of the wave, which is also delayed and arrives at the receiver later, to potentially destructively interfere with the directly transmitted portion. For circularly polarized waves, however, the polarization reversal does not result in interference of the reflected component with the directly transmitted component. As such, the circular polarization required for this desirable characteristic to be achieved may be easily generated using one or more helical antennas. As such, the exemplary embodiment recovers Wi-Fi signal power that is lost due to multipath interference and combines the recovered signal with the directly transmitted signal to provide a more powerful received signal than would be possible with a standard helical receiving antenna.

However, a portion of the signal energy of the circularly polarized wave is lost due to the multipath interference when helical antennas are used for RF transmission. Further, interference is more pronounced when the antennas are not mounted in a transmission system of sufficient height, as the ground or other obstructions may protrude into the Fresnel zone.

Figure 2:
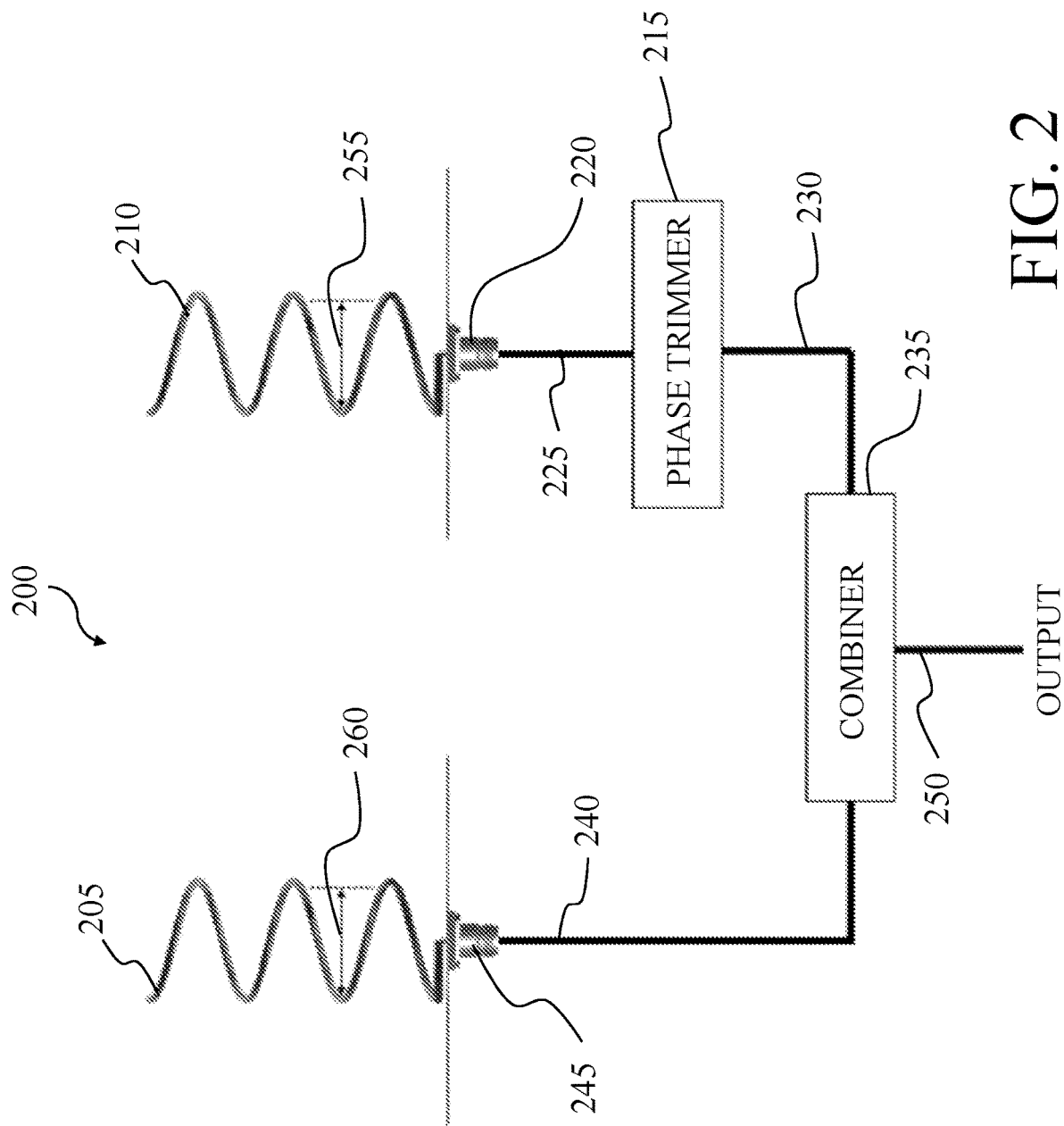
FIG. 2 depicts a block diagram of an exemplary receiving antenna system according to one embodiment of the current disclosure.

Depicted in FIG. 2 is one embodiment of a receiving antenna system (200) of the current disclosure. The system (200) includes a double-helical ("bihelical") receiving antenna comprised of an outer helix (205) and an inner helix (210), a phase trimming device (215) located on the coaxial lead (220) from the inner (or, "recovery") helix (210) receiving the received signal (225) from the inner helix (210) as its input and producing an output signal (230), and a radio frequency combining device (235) that combines the output signal (230) from the phase trimming device (215) with the received signal (240) from the coaxial lead (245) of the outer helix (205) and provides a combined output signal (250).

More particularly, the receiving antenna system (200) thereby consists of two concentric cylinders of appropriate length, around or within each of which is a wound wire helix. The wound wired helices are the outer helix (205) and the inner helix (210), respectively. The outer helix (205) and the inner helix (210) are wound in opposite directions, or "contra-wound." The cylinders can be comprised of, for example, polycarbonate, and can be mounted on a backplane, such as a conducting backplane, to which the coaxial connectors (220,245) are affixed. Each separate helical antenna, the outer helix (205) and the inner helix (210), has its own coaxial connector (220,245). Leads from these coaxial connectors (220,245) electrically couple to an RF signal combiner (235), which combines the two separate RF signals (230, 240) into a single combined output signal (250). For testing, the RF power available at the output (250) of the signal combiner may be measured, for example, with a Hewlett Packard 437B RF Power Meter or other suitable measuring instrument. In addition, the phase trimmer (215) can be, for example, a Pasternack PE8203 phase trimmer. Although the phase trimmer (215) is illustrated to be connected to the output signal (225) of the inner helix (210), the phase trimmer (215) can be installed on either one of the coaxial connector leads (220,245) in a manner which allows a maximum of a 25-degree phase shift to be introduced to allow optimization of the total received power.

In one exemplary embodiment, the outer helix (205) is wound in the direction of polarization of the RF signal transmitted by an RF transmitter which, in one embodiment, is a left-hand circular polarization (LHCP). As such, the inner helix also being contra-wound, is optimized for right-hand circular polarization (RCHP). In this configuration, the greater portion of the signal is received primarily through the outer helix (205), with the inner helix (210) used to receive signal energy that is reflected from the ground (and hence, is oppositely-polarized) or other reflective surface and has an induced phase-delay due to the longer path that portion of the signal must take to reach the receiver. Upon reception of the phase-delayed signal by the inner helix (210), the phase trimmer (215) then subtracts the phase delay. By subtracting the phase delay, the two signals (230, 240) may be combined in-phase and may therefore produce a resulting output (250) that is significantly stronger than the original signal resulting from a single helix, such as the signal (240) provided by the outer helix (205) alone. This antenna system (200) accordingly permits the reception of transmitted HF signals at a greater range or with significant obstructions protruding into the Fresnel zones than would be possible with a single helical receiving antenna, as greater total power is present in the combined output (250) signal. The system (200) also permits the reception of transmitted HF signals across land areas with significant obstructions which would inhibit effective utilization of linearly polarized signals.

In one embodiment, the cylinder diameters (255, 260), corresponding with the outer helix (205) and the inner helix (210), are chosen such that their circumferences (C) both fall within the range: $(3/4)\lambda \leq C \leq (4/3) \lambda$. The circumference of each helix being chosen within this range is important if the helices are to operate in the $T_1$ axial transmission mode.

Figure 3:
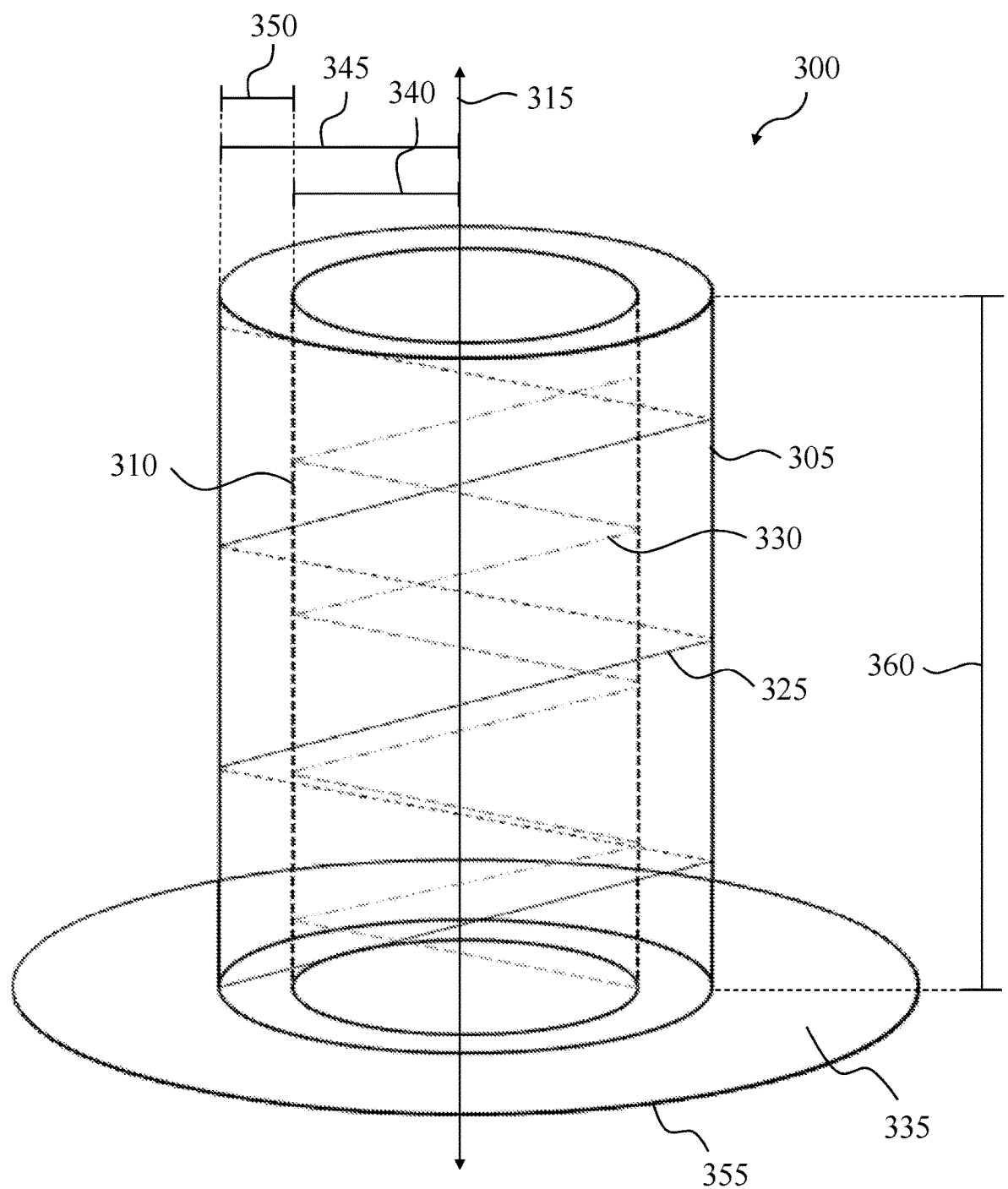
FIG. 3 depicts perspective view of an exemplary receiving antenna according to one embodiment of the current disclosure, shown with the outer cylinder as being transparent for clarity.

Depicted in FIG. 3 is an exemplary receiving antenna (300) according to one embodiment of the current disclosure. The antenna (300) can be, for example, representative of and include similar components and functionality as an assembled combination of outer helix (205) and inner helix (210) of FIG. 2. The antenna (300) includes two concentric cylinders. One cylinder comprises an outer helix (305) and the other cylinder comprises an inner helix (310). The outer helix (305) is configured to encircle the inner helix (310), and both helices (305, 310) are positioned about a common central longitudinal axis (315). Each helix (305, 310) includes a body which can be composed of polycarbonate or any other suitable material, each body of which can include conductive wires wound on or through the body around the circumference about the longitudinal axis (315). The outer helix (305) includes a conductive outer wire (325) and the inner helix (310) includes a conductive inner wire (330), The outer wire (325) and the inner wire (330) are contra-wound (i.e., wound in opposite spiral directions) relative to the backplane (335). The wires can be comprised of, for example, 3-gauge (AWG), 18-gauge (AWG), or 22-gauge (AWG) copper wire, or any other suitable conductive wiring.

For the purpose of demonstration of the principles disclosed herein, one example application of the current disclosure uses radio frequency data transmitted on a carrier frequency of 2.4 GHz using circular polarization in an IEEE 802.11 Wi-Fi format. It should be understood that one embodiment utilizing 2.4 GHz is described for example purposes only, and any suitable frequency may be applied to the systems and methods described herein. A 2.4 GHz signal thereby implies that A is equal to 0.124913 meters, which is further equal to 4.9178346 inches. Therefore, this is the circumference, C. From above, it can therefore be calculated that, in this example, the diameter of each helix, to be operable in the $T_1$ axial transmission mode, must define circumferences of each helix (305, 310) between about 3.688 inches and 6.557 inches. For a single helical antenna, one optimal selection for C is one wavelength. In the coaxial arrangement where the two antennas are contra-wound with respect to each other, providing both polarization modes, the inner helix (310) circumference can be selected to be (3/4) λ, which is approximately 3.688 inches. The outer helix (305) circumference can then be selected as (4/3) λ, which is approximately 6.557 inches. As such, the inner helix (310) can include a radius (340) of about 0.586 inches while the outer helix (305) includes a radius (345) of about 1.043 inches. Therefore, a gap or spatial void (350) is defined between the outer helix (305) and the inner helix (310) for separating the wires outer (325) and inner (330) wires from contacting one another and to permit the bihelical shape. In some embodiments, the gap (350) is filled with air, while in other embodiments the gap (350) is filled with an insulating material.

As described herein, the bottom surface (355) of the backplane (335) can be electrically coupled to a system for receiving and manipulating the data signals received. For example, the bottom surface (355) can include first and second coaxial connectors (not shown) coupled to each of the outer (325) and inner (330) wires, respectively. The antenna (300) can be manufactured to any desired length (360) provided the length (360) is adequate for permitting an effective number of turns for each wire (325, 330) for receiving transmission signals. In some embodiments, the wires (325, 330) are provided with equal lengths, or substantially equal lengths, and are thereby configured to receive signals of the same broadcast frequency band.

A data-driven safety improvement program facilitated by the antenna systems and methods described herein could aid in preserving America's general aviation network, better connecting people and ideas. The safety measures put in place through identification and mitigation of risk factors can be both proactive and reactive in nature. Working to prevent future harm, data gathered, and transmitted as part of the proposed program can be analyzed to obtain grants allocated for specific airfield improvement areas. Measurement, transmission, storage, and analysis of infrastructure usage and characteristics, such as ice build-up on taxiways and runways, can guide airport managers to optimally allocate funds and would also provide a historical source as to verify problem solutions. To improve the effectiveness of emergency responders in attending to aviation incidents, reactive safety options include the development of software that, using provided flight operations and patterns data, procures automatic police and rescue dispatch if large irregularities in an aircraft's flight movements are found. In addition to reducing immediate injury and damage, initiatives supported by this data collection can be applied to the studies of larger, negative externalities of aviation. Aircraft movements data compiled by nearby airfields may be used to model noise and air pollution in surrounding areas, quantifying effects of aviation operations for further social analysis, While having an impact on the general aviation industry, the hardware and software developed can provide reliable, cheap, and efficient network access for rural areas, Beyond aviation, a similar data-driven safety improvement program can be deployed to America's rural highways. With data transmission facilitated by the antenna system, information on road conditions, traffic speed, infrastructure integrity, and accident patterns can be gathered and transmitted to transportation departments and safety oversight boards. As automobile accidents are one of America's leading causes of death, especially among the younger population, improving both proactive and reactive road safety measures are important for protecting the demographic momentum of America's rural communities. Improvements in data transmission and trends in data analytics seek to transform not only safety in the transportation industry, but profitability in the farming industry as well. Stretching across large swathes of land, the majority of farms are rurally located and Internet inaccessible, though having the potential to generate high volumes of data from the large scale of their operations. Collected by the software-intensive tractors of modern agriculture, this data can depict weather and soil conditions to optimize planting and harvesting plans. To effectively compile, store, and analyze this data, the aforementioned data transmission system could connect farms to network access points. The general Internet connectivity potential of this data transmission system can also connect rural communities to urban data centers.

Reference systems that may be used herein can refer generally to various directions (e.g., upper, lower, forward and rearward), which are merely offered to assist the reader in understanding the various embodiments of the disclosure and are not to be interpreted as limiting.

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used or applied in combination with some or all of the features of other embodiments unless otherwise indicated. One or more exemplary embodiments have been shown and described, and all changes and modifications that come within the spirit of the disclosure are desired to be protected.

What is claimed is:

1. A system for recovering transmitted radio frequency power lost to multipath interference, comprising:
a first helical antenna including a first conductive wire and defining a first circumference defining a first radius, wherein the first helical antenna is operable to receive a first electromagnetic signal;
a second helical antenna including a second conductive wire and defining a second circumference defining a second radius, wherein the second helical antenna is operable to receive a second electromagnetic signal and the first and second conductive wires are contra-wound;
a phase adjuster operatively coupled to the first helical antenna and configured to
receive the first electromagnetic signal as an input signal,
apply an adjustable phase delay to the input signal, and output an adjusted electromagnetic signal; and
a signal combiner operatively coupled to the phase adjuster and the second helical antenna and configured to
receive the adjusted electromagnetic signal and the second electromagnetic signal,
combine the adjusted electromagnetic signal and the second electromagnetic signal, and
output a combined electromagnetic signal.

2. The system of claim 1, wherein the first and second helical antennas are configured to receive electromagnetic signals that are circularly polarized.

3. The system of claim 1, wherein the first radius of the first helical antenna is greater than the second radius of the second helical antenna, and wherein the first and second helical antennas share a common longitudinal axis, wherein the second helical antenna is positioned inside the first helical antenna.

4. The system of claim 1, wherein the second radius of the second helical antenna is greater than the first radius of the first helical antenna, and wherein the first and second helical antennas share a common longitudinal axis, wherein the first helical antenna is positioned inside the second helical antenna.

5. The system of claim 1, wherein the circumferences of the first and second helical antennas define a spatial void.

6. The system of claim 1, comprising:
a backplane, wherein an end of the first helical antenna and an end of the second helical antenna are mounted to the backplane.

7. The system of claim 1, wherein the combined electromagnetic signal contains a greater output power than either of the first electromagnetic signal received by the first helical antenna and the second electromagnetic signal received by the second helical antenna.

8. The system of claim 1, wherein the system is configured to boost power of a transmitted signal from a transmitter, wherein the first electromagnetic signal and the second electromagnetic signal originate from the transmitted signal, and wherein the second electromagnetic signal is a resultant wave of multipath interference relative to the first electromagnetic signal.

9. The system of claim 1, wherein the first circumference and the second circumference are each chosen from the range of $(3/4)\lambda \leq C \leq (4/3)\lambda$.

10. A system for recovering transmitted radio frequency power lost to multipath interference, comprising:
a first helical antenna defining a first circumference defining a first radius, wherein the first helical antenna is operable to receive a first electromagnetic signal; and
a second helical antenna defining a second circumference defining a second radius, wherein the second helical antenna is operable to receive a second electromagnetic signal;
wherein
the first radius of the first helical antenna is greater than the second radius of the second helical antenna, and wherein the first and second helical antennas share a common longitudinal axis, wherein the second helical antenna is positioned inside the first helical antenna,
the first helical antenna includes a first conductive wire and the second helical antenna includes a second conductive wire, wherein the first and second conductive wires are contra-wound, and
the combined electromagnetic signal contains a greater output power than either of the first electromagnetic signal received by the first helical antenna and the second electromagnetic signal received by the second helical antenna.

11. The system of claim 10, wherein the system is configured to boost power of a transmitted signal from a transmitter, wherein the first electromagnetic signal and the second electromagnetic signal originate from the transmitter, and wherein the second electromagnetic signal is a resultant wave of multipath interference relative to the first electromagnetic signal.

12. The system of claim 10, comprising:
a phase adjuster operatively coupled to the first helical antenna and configured to
receive the first electromagnetic signal as an input signal,
apply an adjustable phase delay to the input signal, and output an adjusted electromagnetic signal; and
a signal combiner operatively coupled to the phase adjuster and the second helical antenna and configured to
receive the adjusted electromagnetic signal and the second electromagnetic signal,
combine the adjusted electromagnetic signal and the second electromagnetic signal, and
output a combined electromagnetic signal.

13. The system of claim 12, wherein the first circumference and the second circumference are each chosen from the range of $(3/4)\lambda \leq C \leq (4/3)\lambda$.

14. An apparatus for receiving transmitted radio frequency signals, comprising:
a first concentric cylinder having a first circumference defining a first radius and a first length;
a second concentric cylinder having a second circumference defining a second radius and a second length;
a first conductive wiring wound around the first concentric cylinder in a first direction, wherein the first conductive wiring is operable as a first antenna for receiving a first electromagnetic signal;
a second conductive wiring wound around the second concentric cylinder in a second direction different from the first direction, wherein the second conductive wiring is operable as a second antenna for receiving a second electromagnetic signal; and a phase trimmer configured to apply a phase delay to the second electromagnetic signal and to output a phase-adjusted electromagnetic signal;

wherein the apparatus is configured to boost power of a transmitted signal from a transmitter.

15. The apparatus of claim 14, wherein the second direction is opposite to the first direction.

16. The apparatus of claim 14, wherein the first radius of the first concentric cylinder is greater than the second radius of the second concentric cylinder and the second concentric cylinder is positioned inside the first concentric cylinder.

17. The apparatus of any of claim 16, wherein the first and second concentric cylinders share a common longitudinal axis.

18. The apparatus of claim 16, wherein the first length is equal to the second length.

19. The apparatus of claim 14, comprising:

a signal combiner configured to receive the phase-adjusted electromagnetic signal and the first electromagnetic signal and output a combined electromagnetic signal.

20. The apparatus of claim 14, wherein the first circumference and the second circumference are each chosen from the range of $(3/4)\lambda \leq C \leq (4/3)\lambda$.

* * * * *